(12) United States Patent
Yang

(10) Patent No.: US 8,622,867 B1
(45) Date of Patent: Jan. 7, 2014

(54) DIFFERENTIAL WITH TORQUE DISTRIBUTION

(76) Inventor: Lei Yang, Novi, MI (US)

(*) Notice: Subject to any disclaimer, the term of this patent is extended or adjusted under 35 U.S.C. 154(b) by 94 days.

(21) Appl. No.: 13/374,285

(22) Filed: Dec. 20, 2011

(51) Int. Cl.
F16H 48/22 (2006.01)

(52) U.S. Cl.
USPC .......................................... 475/221; 475/330

(58) Field of Classification Search
None
See application file for complete search history.

(56) References Cited

U.S. PATENT DOCUMENTS

| 7,080,707 | B2 * | 7/2006 | Kirkwood | 180/245 |
| 7,226,379 | B2 * | 6/2007 | Ibamoto et al. | 475/221 |
| 7,238,140 | B2 | 7/2007 | Gradu | |
| 7,491,147 | B2 | 2/2009 | Ross | |
| 7,503,866 | B2 | 3/2009 | Puiu | |
| 7,588,511 | B2 | 9/2009 | Tangl | |
| 7,708,665 | B2 | 5/2010 | Wheals | |
| 7,811,194 | B2 | 10/2010 | Bowen | |
| 8,246,502 | B2 * | 8/2012 | Esplin et al. | 475/83 |
| 2007/0155577 | A1 * | 7/2007 | Nett et al. | 475/221 |

* cited by examiner

Primary Examiner — David D Le
Assistant Examiner — Mark Manley

(57) ABSTRACT

A differential with torque distribution comprises two differentials. The two differentials can be connected in serial with one of the side gear of the first differential driving the housing of the second differential, and one of the side gear of the second differential being connected to the other side gear of the first differential, and vise versa. Hence the torque on the two output shafts of the differential with torque distribution are different. The rotational speeds on the respective two output shafts are independent of the change of torque on the two output shafts.

7 Claims, 20 Drawing Sheets

DIFFERENTIAL WITH TORQUE DISTRIBUTION

FIELD OF INVENTION

The invention relates generally to the automotive differential and torque distribution on its output shafts.

BACKGROUND OF THE INVENTION

The conventional open differential of automotive distributes driving torque evenly to its two output shafts. Various torque-vectoring designs are attempted and approached. Some of them are based on varying gear ratio as means to vary torque, as is disclosed in the patent U.S. Pat. No. 7,491,147 B2, and U.S. Pat. No. 7,708,665 B2. However such means of varying torque for particular shafts will cause the change of the rotational speed of the shafts accordingly.

SUMMARY OF THE INVENTIONS

The present invention relates to a design and implementation of differential with torque distribution for automotive vehicles. It comprises two regular differentials familiar to those in the field. The two differentials are coupled in serial. In one aspect of the present invention, it can distribute driving torque to its two output shafts with differential amplitude relative to the driving torque at its input. In another aspect of the present invention, it varies torque on its two output shafts without changing rotational speeds of the output shafts correspondingly.

DETAILED DESCRIPTION OF THE EMBODIMENTS

Figure 1:
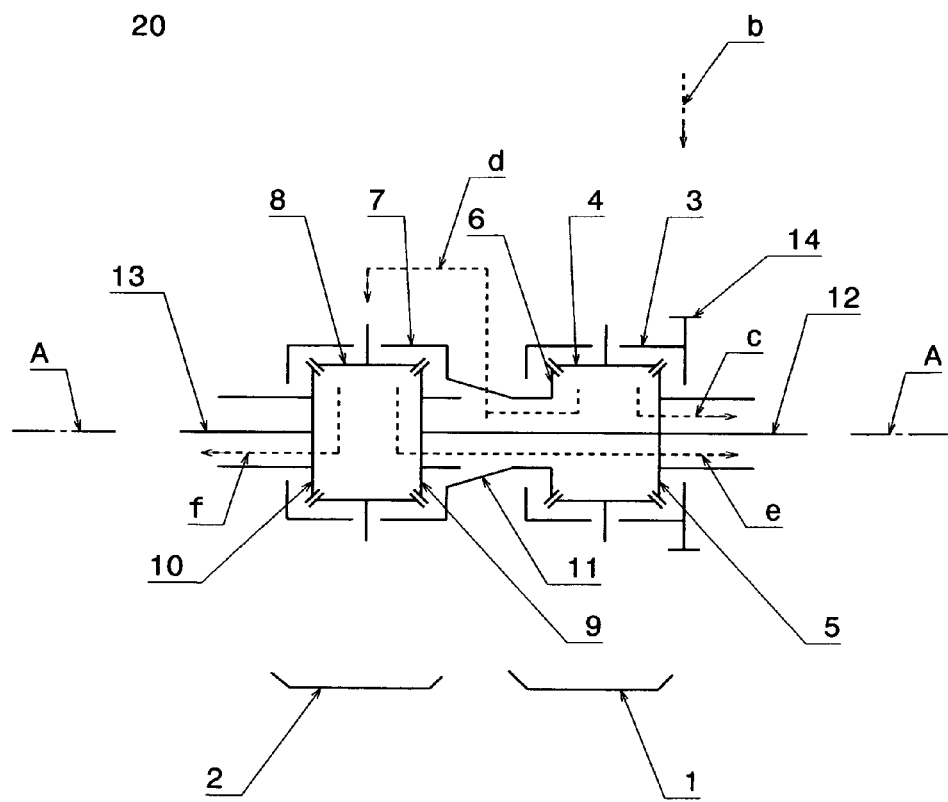
FIG. 1 is a schematic representation of the differential with torque distribution in a first embodiment.

Referring to FIG. 1, the differential with torque distribution in one embodiment 20 comprises differentials 1 and 2. The differential 1 comprises a housing 3, two side gears 5 and 6, a set of pinion gears 4. The side gear 5, 6, and the set of the pinion gears 4 are pivotally positioned in the housing 3. The set of pinion gears 4 mesh with the side gears 5 and 6. The differential 2 comprises a housing 7, two side gears 9 and 10, a set of pinion gears 8. The side gear 9, 10, and the set of pinion gears 8 are pivotally positioned in the housing 7. The set of pinion gears 8 mesh with the side gears 9 and 10. The differentials 1 and 2 are pivotally positioned about an axis A, next to each other. A coupling element 11 connects the side gear 6 to the housing 7 such that the side gear 6 and the housing 7 rotate together. A shaft 12 is connected to the side gears 5 and 9 such that the shaft 12, the side gears 5 and 9 rotate together. A shaft 13 is connected to the side gear 10 such that the shaft 13 and the side gear 10 rotate together. A gear 14 is firmly connected to the housing 3.

The driving torque b is applied to the gear 14, and is transferred to and equally shared by the side gears 5 and 6 through the housing 3 and the set of pinion gears 4. The torque c on the side gear 5, the torque d on the side gear 6 are about 50% of the driving torque b each. The torque c on the side gear 5 is transferred onto the shaft 12. The torque d on the side gear 6 is transferred to and equally shared by the side gear 9 and 10 through the coupling elements 11, the housing 7, the set of pinion gears 8. The torque e on the side gear 9, the torque f on the side gear 10 are about 50% of the torque d each. The torque e on the side gear 9 is transferred onto the shaft 12. The torque f on the side gear 10 is transferred onto the shaft 13. Thus the torque on the shaft 12 is the addition of the torque c and e, and is about 75% of the driving torque b; the torque f on the shaft 13 is about 25% of the driving torque b. The shaft 12, 13 can rotate at the same or different speed, which is independent of the torque c, e f.

Figure 2:
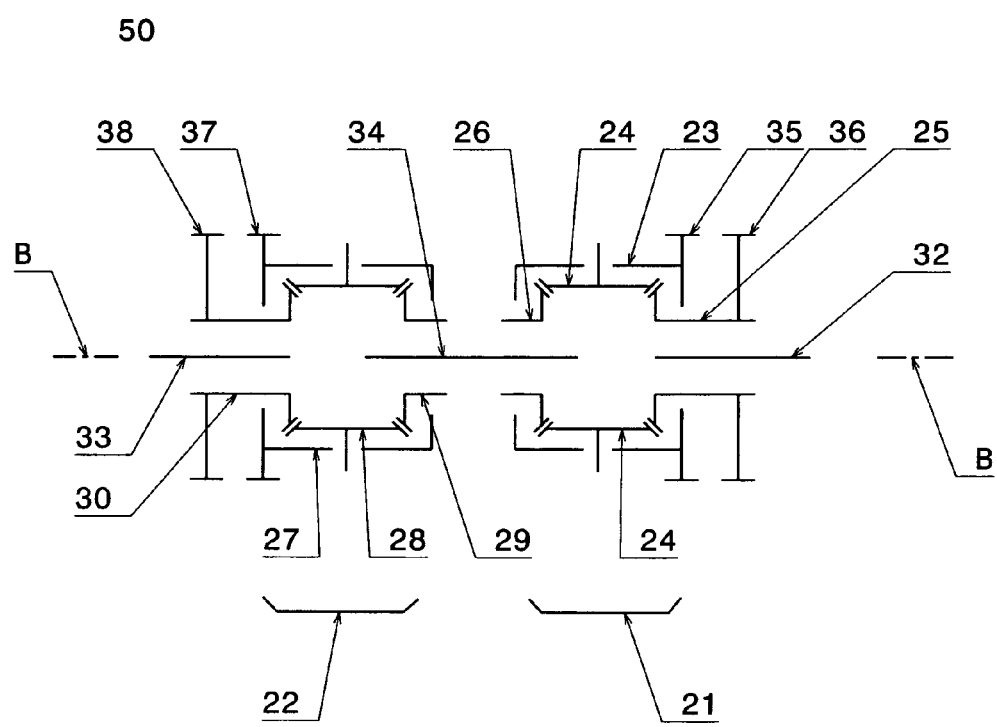
FIG. 2 is a schematic representation of the differential with torque distribution in a second embodiment.

FIG. 2 shows the differential with torque distribution in a second embodiment 50. It comprises two conventional differentials 21 and 22. The differential 21 comprises a housing 23, two side gears 25 and 26, a set of pinion gears 24. The side gear 25, 26, and the set of the pinion gears 24 are pivotally positioned in the housing 23. The set of pinion gears 24 mesh with the side gears 25 and 26. The differential 22 comprises a housing 27, two side gears 29 and 30, a set of pinion gears 28. The side gear 29, 30, and the set of pinion gears 28 are pivotally positioned in the housing 27. The set of pinion gears 28 mesh with the side gears 29 and 30. The differentials 21 and 22 are pivotally positioned about an axis B, next to each other. The differential with torque distribution 50 also comprises shafts 32, 34, 33, which are pivotally positioned about the axis B. A gear 35 is firmly connected to the housing 23, a gear 37 is firmly connected to the housing 27. A gear 36 is connected to the side gear 25. A gear 38 is connected to the side gear 30. The shafts 32 and 33 are both output shafts.

Figure 3:
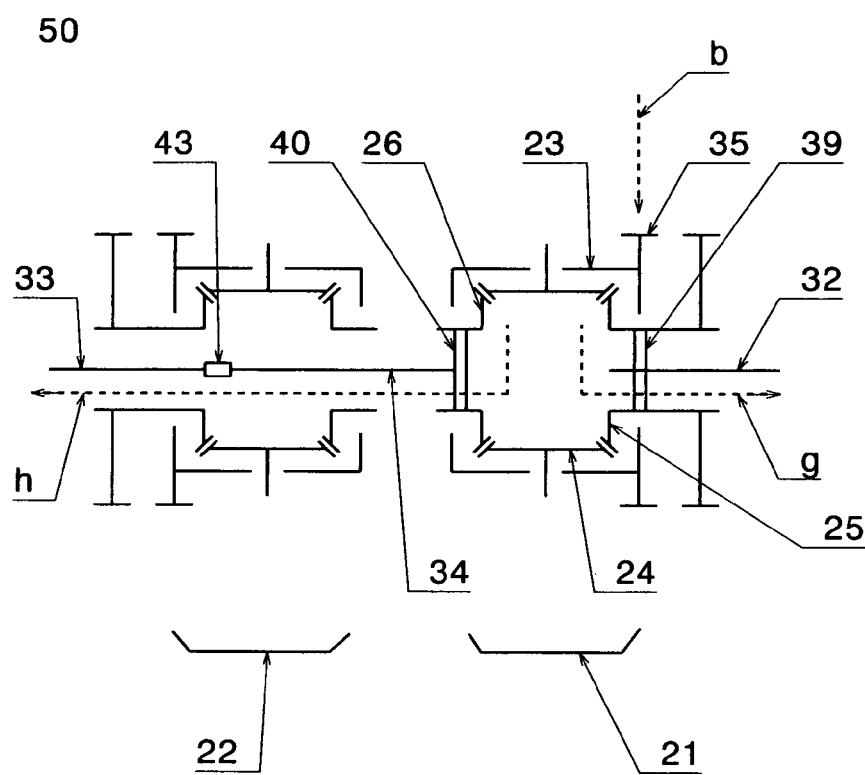
FIG. 3 is a schematic representation of mode 1 of the differential with torque distribution in the second embodiment.

Referring to FIG. 3, a coupling element 39 engages and connects the side gear 25 to the shaft 32. A coupling element 40 engages and connects the side gear 26 to the shaft 34. A coupling element 43 engages and connects the shaft 34 and 33. A driving torque b is applied to the gear 35, and transferred to and equally shared by the side gears 25 and 26 through the housing 23, the set of pinion gears 24. The torque g on the side gear 25 is further transferred onto the shafts 32 through the coupling element 39, the torque h on the side gear 26 is further transferred onto the shaft 33 through the coupling element 40, 43, and the shafts 34. The torque g on the shaft 32, the torque h on the shaft 33 are about 50% of the driving torque b each. The shaft 32 and 33 can rotate at the same or different speed. This is mode 1.

Figure 4:
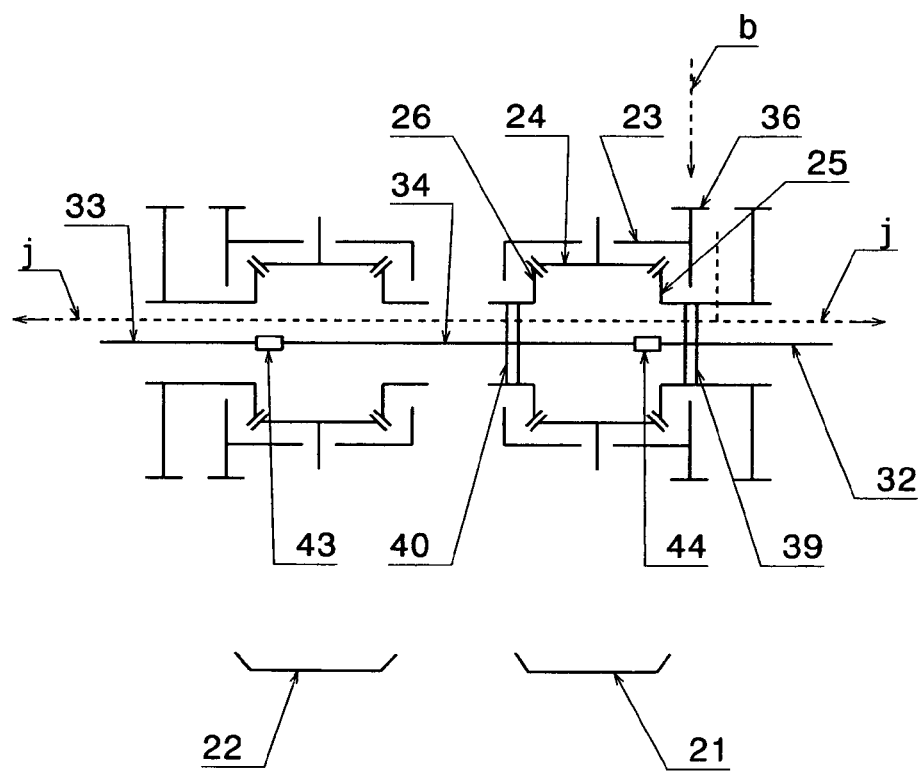
FIG. 4 is a schematic representation of mode 2 of the differential with torque distribution in the second embodiment.

Referring to FIG. 4, the coupling element 39 engages and connects the side gear 25 to the shaft 32. The coupling element 40 engages and connects the side gear 26 to the shaft 34. A coupling element 44 engages and connects the shaft 32 and 34. The coupling element 43 engages and connects the shaft 33 and 34. Thus the side gears 25, 26 are tied together, and can not rotate relatively to each other. The driving torque b is applied to the gear 36, and is transferred to and equally shared by the side gears 25 and 26 through the housing 23, the set of pinion gears 24. The torque j on the side gears 25 and 26 is transferred to the shafts 32 and 33 through the coupling elements 39, 40, 43, 44, and the shaft 34. The shafts 32 and 33 rotate at the same speed. This is mode 2.

Figure 5:
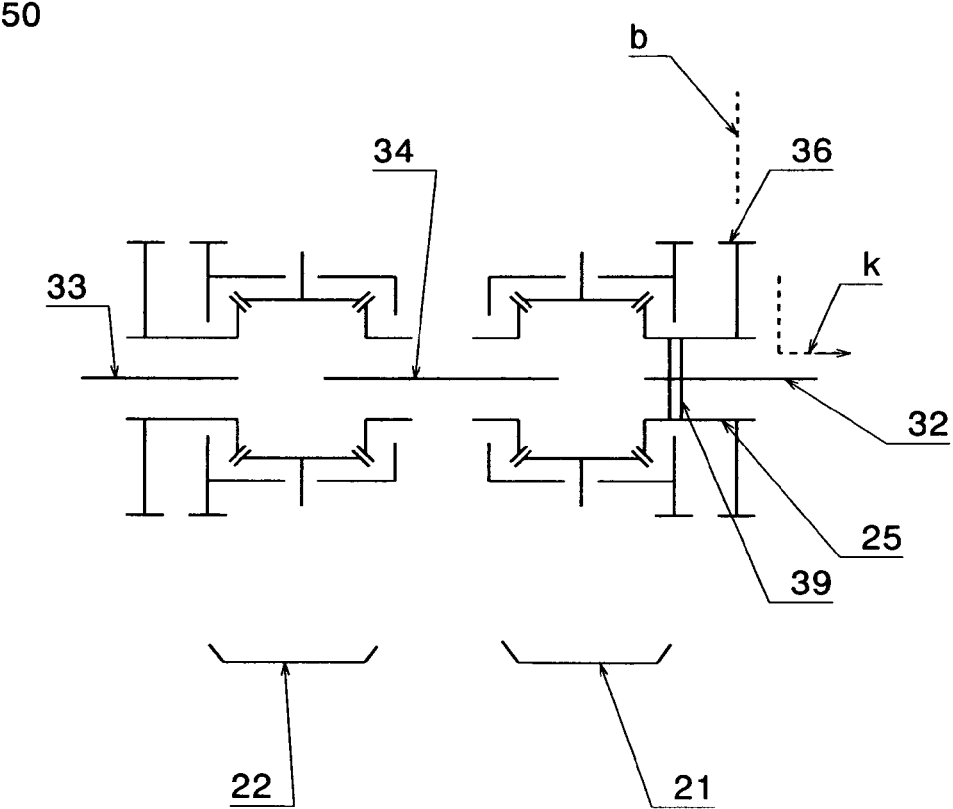
FIG. 5 is a schematic representation of mode 3 of the differential with torque distribution in the second embodiment.

Referring to FIG. 5, the driving torque b is applied to the gear 36, and is 100% transferred to the shaft 32 through the side gear 25. The shaft 33 rotates freely. This is mode 3.

Figure 6:
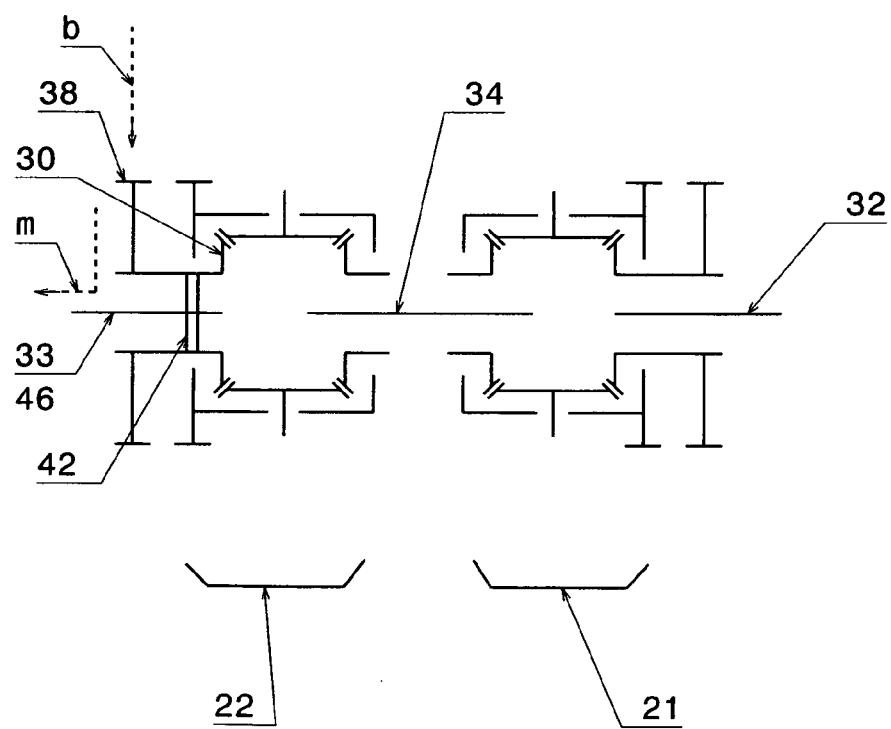
FIG. 6 is a schematic representation of mode 4 of the differential with torque distribution in the second embodiment.

Referring to FIG. 6, the driving torque b is applied to the gear 38, and is 100% transferred to the shaft 33 through the side gear 30. The shaft 32 rotates freely. This is mode 4.

Figure 7:
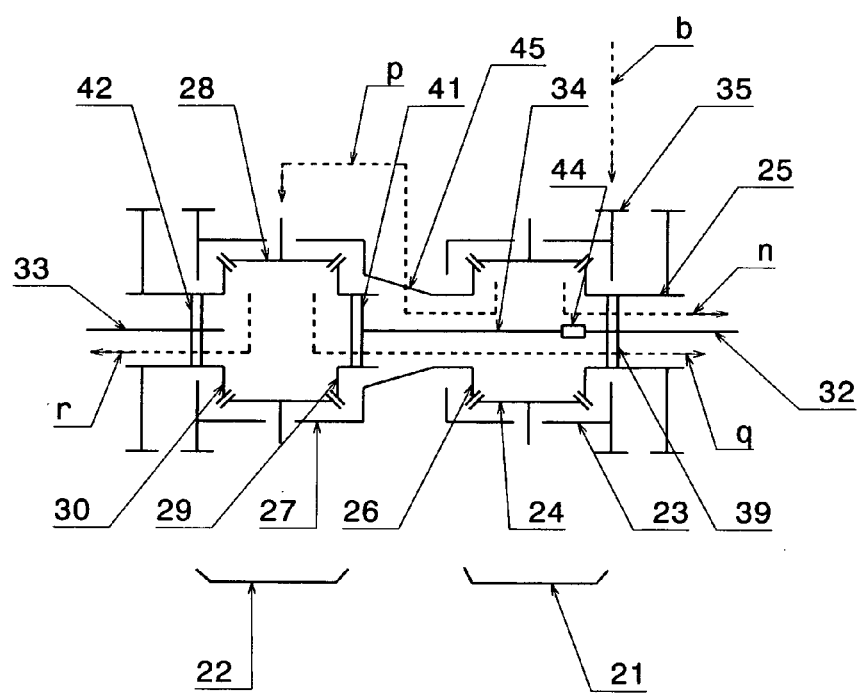
FIG. 7 is a schematic representation of mode 5 of the differential with torque distribution in the second embodiment.

Referring to FIG. 7, the coupling element 39 engages and connects the side gear 25 to the shaft 32. The coupling element 42 engages and connects the side gear 30 to the shaft 33. The coupling element 41 engages and connects the side gear 29 to the shaft 34. The coupling element 44 engages and connects the shaft 34 to the shaft 32. A coupling element 45 engages and connects the side gear 26 to the housing 27 in a first configuration. The driving torque b is applied to the gear 35, and is transferred to and equally shared by the side gears 25 and 26 through the housing 23 and the set of pinion gears 24. The torque n on the side gear 35, the torque p on the side gear 26 are about 50% of the driving torque b each. The torque n on the side gear 25 is transferred onto the shaft 32 through the coupling element 39. The torque p on the side gear 26 is transferred to and equally shared by the side gear 29 and 30 through the coupling elements 45, the housing 27, the set of pinion gears 28. The torque q on the side gear 29, the torque r on the side gear 30 are about 50% of the torque p each. The torque q on the side gear 29 is transferred onto the shaft 32 through the coupling elements 41, 44, the shaft 34. The torque r on the side gear 30 is transferred onto the shaft 33 through the coupling element 42. Thus the torque on the shaft 32 is the addition of the torque n and q, and is about 75% of the driving torque b; the torque r on the shaft 33 is about 25% of the driving torque b. The shaft 32, 33 can rotate at the same or different speed, which is independent of the torque n, q r. This is mode 5.

Figure 8:
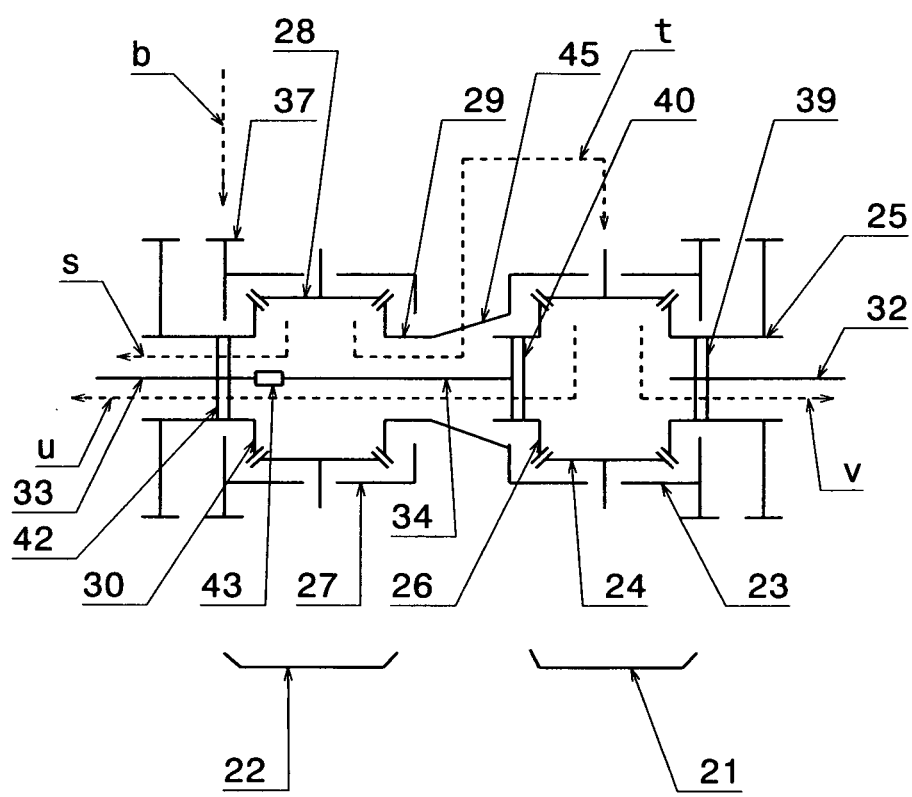
FIG. 8 is a schematic representation of mode 6 on the differential with torque distribution in the second embodiment.

Referring to FIG. 8, the coupling element 42 engages and connects the side gear 30 to the shaft 33. The coupling element 39 engages and connects the side gear 25 to the shaft 32. The coupling element 40 engages and connects the side gear 26 to the shaft 34. The coupling element 43 engages and connects the shaft 34 to the shaft 33. The coupling element 45 engages and connects the side gear 26 to the housing 27 in a second configuration. The driving torque b is applied to the gear 37, and is transferred to and equally shared by the side gear 29 and 30 through the housing 27 and the set of pinion gears 28. The torque s on the side gear 30, the torque t on the side gear 29 are about 50% of the driving torque b each. The torque s on the side gear 30 is transferred onto the shaft 33 through the coupling element 42. The torque t the side gear 29 is transferred to and equally shared by the side gears 25 and 26 through the coupling element 45, the housing 23, the set of pinion gears 24. The torque u on the side gear 26, the torque v on the side gear 25 are about 50% of the torque t each. The torque u on the side gear 26 is transferred onto the shaft 33 through the coupling elements 40, 43, and the shaft 34. The torque v on the side gear 25 is transferred onto the shaft 32 through the coupling element 39. Thus the torque on the shaft 33 is the addition of the torque s and u, and is about 75% of the driving torque b, the torque v on the shaft 32 is about 25% of the driving torque b. The shaft 32, 33 can rotate at the same or different speed, which is independent of the torque s, u, v. This is mode 6.

In the mode 1 of the differential with torque distribution 50, the driving torque is evenly distributed to its two output shafts, and the two output shafts can rotate with the same or different speed. In the mode 2, the driving torque is evenly distributed to its two output shafts, and the two output shafts rotate together. In the mode 3 and 4, the driving torque is distributed 100% to one output shaft with the other output shaft rotates freely. In the mode 5 and 6, the torque is distributed unevenly to its two output shafts by putting the two differentials in serial with one of the side gear of one differential driving the other differential, and the other side gear of the first differential being connected to the side gear of the second differential of the same side. The two output shafts are still connected to the two differentials, thus their rotating speed can be different from each other as well as independent of the torque they transfer.

Switching modes among the mode 1, 3, 4, 5, and 6 makes the torque on the shafts 32 and 33 change. Switching modes among the mode 1, 3, 4, 5, and 6 does not necessarily make the speed of the shaft 32 and 33 change. The change of the torque on the shafts 32 and 33 is independent of the speed or speed change of the shafts 32 and 33 during the mode switching. This is due to the nature of the differential, and the application along with arrangement of differentials in the differential with torque distribution. This is different than varying torque by switching gear ratio. In the mechanism of switch gear ratio, power=torque*rotational speed=constant. Thus increase of torque causes decrease of rotational speed and vise versa.

Figure 9:
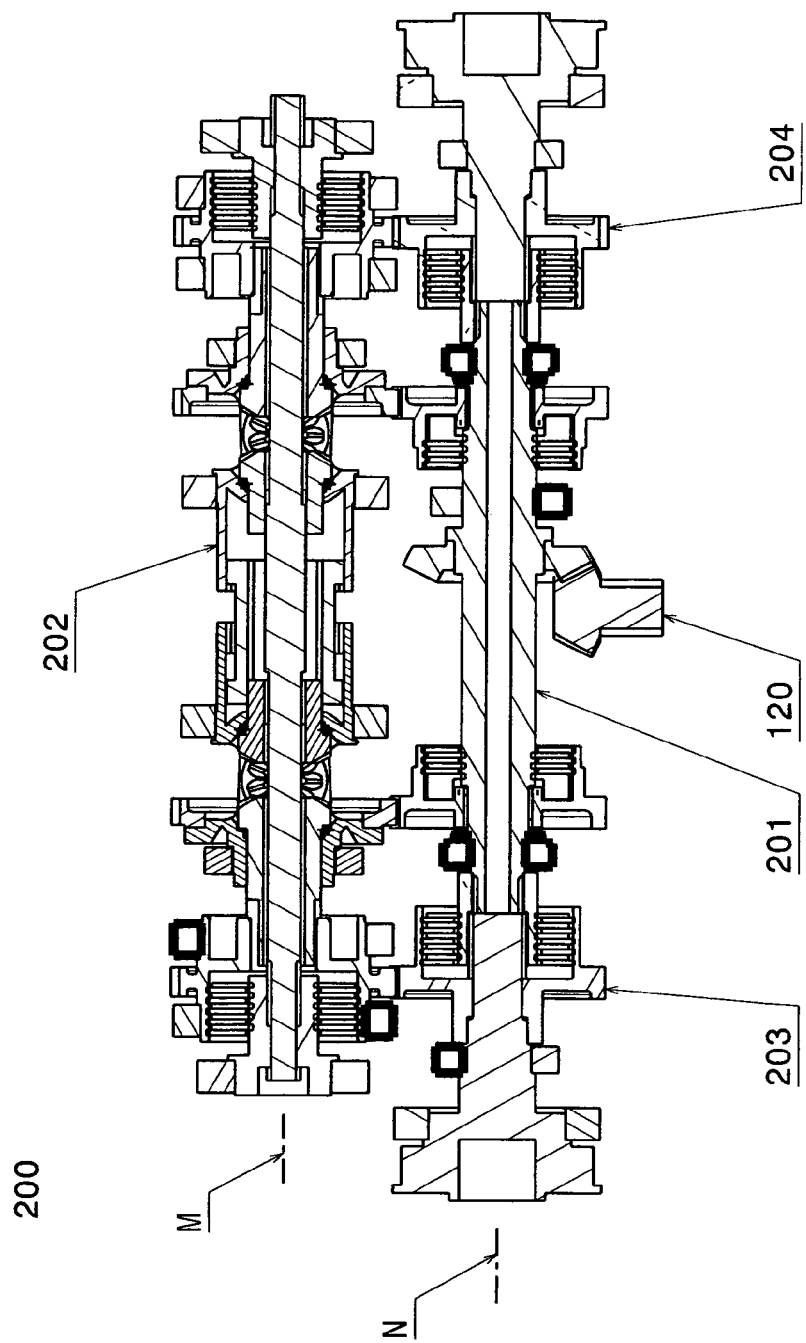
FIG. 9 is a section view of a design of the second embodiment of the differential with torque distribution.

FIG. 9 shows a design 200 of the second embodiment 50 of the differential with torque distribution. It comprises an input unit 201, a differential unit 202, two output units 203 and 204.

Figure 10:
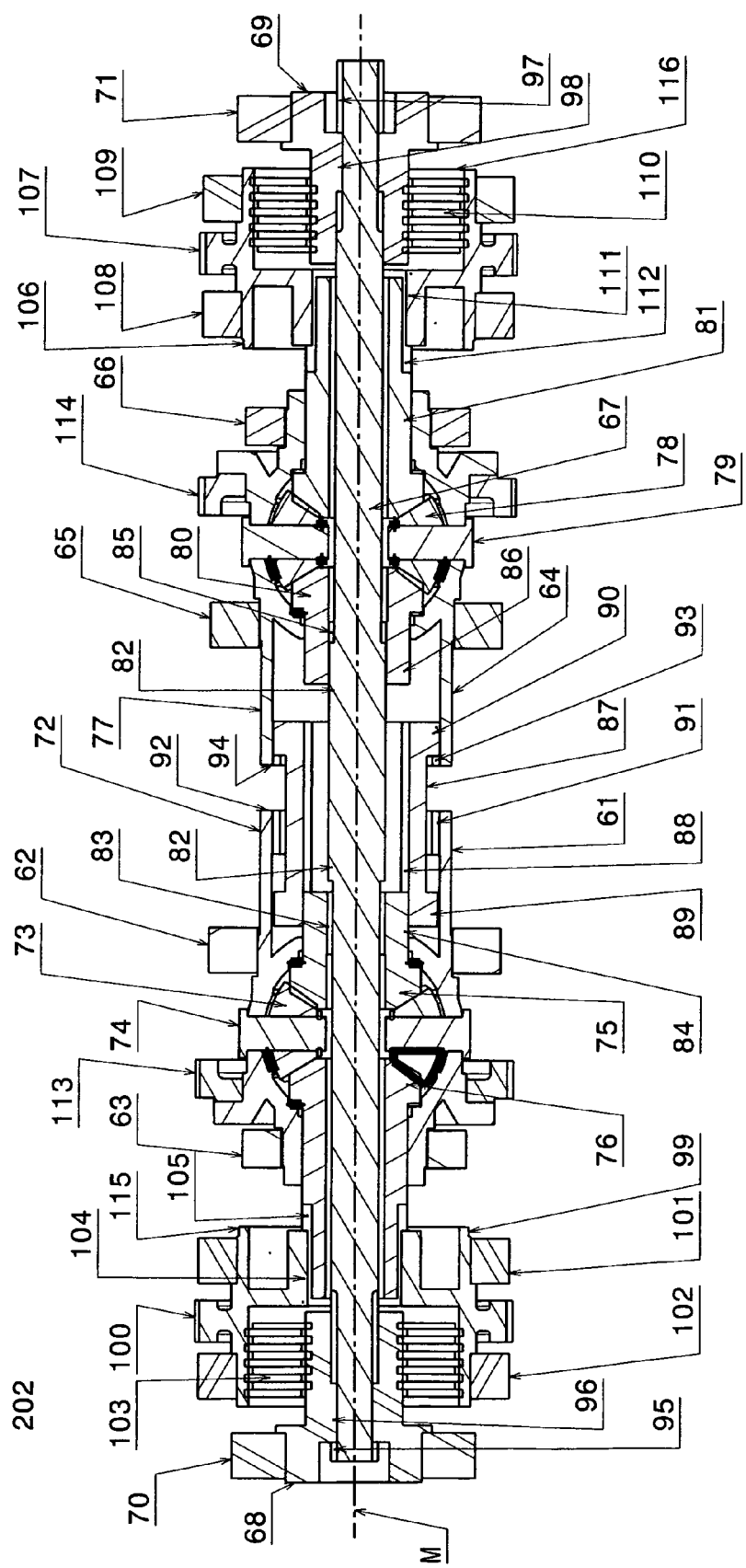
FIG. 10 is a section view of the differential unit of the design with the differential with torque distribution in the second embodiment in one configuration.

Referring to FIG. 10, the differential unit 202 comprises two differentials 61 and 64, a shaft 67, a sleeve 87, two hubs 68 and 69, two coupling units 115 and 116. The differential 61 has a set of pinion gears 73 pivotally positioned by pins 74 to the housing 72, a side gear 75 pivotally positioned in the housing 72 about an axis M, and a side gear 76 pivotally positioned in the housing 72 about the axis M. The set of pinion gears 73 mesh with the side gears 75 and 76. A gear 113 is firmly connected to the housing 72. The differential 61 is pivotally supported by two bearings 62 and 63 on its housing 72 about the axis M.

The differential 64 has a set of pinion gears 78 pivotally positioned by pins 79 to the housing 77, a side gear 80 pivotally positioned in the housing 77 about the axis M, and a side gear 81 pivotally positioned in the housing 77 about the axis M. The set of pinion gears 78 mesh with the side gears 80 and 81. A gear 114 is firmly connected to the housing 77. The differential 64 is supported by two bearings 65 and 66 on its housing 77 about the axis M.

The hub 68 is pivotally supported by a bearing 70 about the axis M. The hub 69 is pivotally supported by a bearing 71 about the axis M. The shaft 67 is pivotally supported by the hubs 68 and 69, and can slide along the axis M. The shaft 67 is positioned through the side gears 75 and 76 of the differentials 61, the side gears 80 and 81 of the differential 64. The shaft 67 has external spline 82 in the middle, external spline 95 at one end, external spline 97 at the other end. The hub 68 has internal spline 96. The hub 69 has internal spline 98. The spline 95 engage the spline 96, the spline 97 engage the spline 98.

The sleeve 87 is pivotally supported by the housings 72 and 77 about the axis M, and can slide along the axis M. The sleeve 79 has external spline 89 on one end, external spline 90 on the other end, and internal spline 88.

Figure 11:
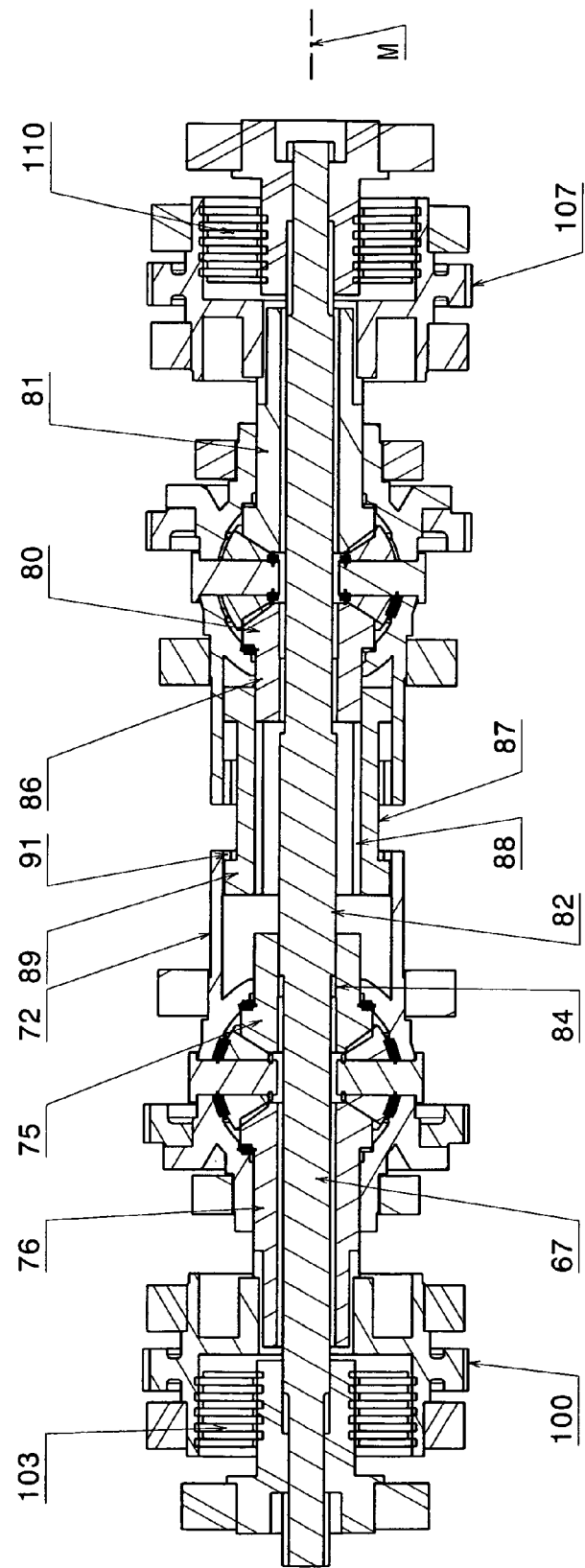
FIG. 11 is the section view of the differential unit of the design with the differential with torque distribution in the second embodiment in another configuration.

Referring to FIGS. 10, 11, the side gear 75 has external spline 84 and internal spline 83. The side gear 80 has external spline 86 and internal spline 85. The housing 72 has internal spline 91 on its end 92. The housing 77 has internal spline 93 on its end 94. When the shaft 67 is shifted to right to a position 1 as shown in FIG. 10, the spline 82 engages the spline 85, the shaft 67 rotates along with the side gear 80. When the shaft 67 is shifted to left to a position 2 as shown in FIG. 11, the spline 82 engage the spline 83, the shaft 67 rotates along with the side gear 75. The unit to shift the shaft 67 between the position 1 and 2 is not shown. When the sleeve 87 is shifted to left to a position 3 as shown in FIG. 10, the spline 88 engage the spline 84, the spline 90 engage the spline 93, the sleeve 87, the side gear 75, the housing 77 rotate together. When the sleeve 87 is shifted to right to a position 4 as shown in FIG. 11, the spline 89 engage the spline 91, the spline 88 engage the spline 86, the sleeve 87, the side gear 80, the housing 72 rotate together. The unit to shift the sleeve 87 between the position 3 and 4 is not shown.

The coupling unit 115 comprises a housing 99, a clutch 103. The housing 99 is pivotally supported by two bearings 101 and 102. A gear 100 can be part of the housing 99. The housing 99 has internal spline 104 engaging external spline 105 on the side gear 76, such that the housing 99 and the gear 100 rotate along with the side gear 76. When the clutch 103 engages and connects the hub 68 to the housing 99, the housing 99 and the gear 100 rotate along with the shaft 67.

The coupling unit 116 comprises a housing 106, a clutch 110. The housing 106 is pivotally supported by two bearings 108 and 109. A gear 107 can be part of the housing 106. The housing 106 has internal spline 111 engaging external spline 112 on the side gear 81, such that the housing 106 and the gear 107 rotate along with the side gear 81. When the clutch 110 engages and connects the hub 69 to the housing 106, the housing 106 and the gear 107 rotate along with the shaft 67.

The bearings 62, 63, 65, 66, 101, 102, 108, and 109 are supported by the housing (not shown).

Referring to FIGS. 3, 10, the engagement of the coupling unit 103, the engagement of the spline 82 to 85 resemble the mode 1 of the second embodiment of the differential with torque distribution.

Referring to FIGS. 4, 10, the engagement of the coupling units 110, 103, the engagement of the spline 82 to 85 resemble the mode 2 of the second embodiment of the differential with torque distribution.

Referring to FIGS. 8, 10, the engagement of the coupling unit 110, the engagement of the spline 82 to 85, 88 to 84, 90 to 93 resemble the mode 6 of the second embodiment of the differential with torque distribution.

Referring to FIGS. 7, 11, the engagement of the coupling unit 103, the engagement of the spline 82 to 84, 89 to 91, 88 to 86 resemble the mode 5 of the second embodiment of the differential with torque distribution.

Figure 12:
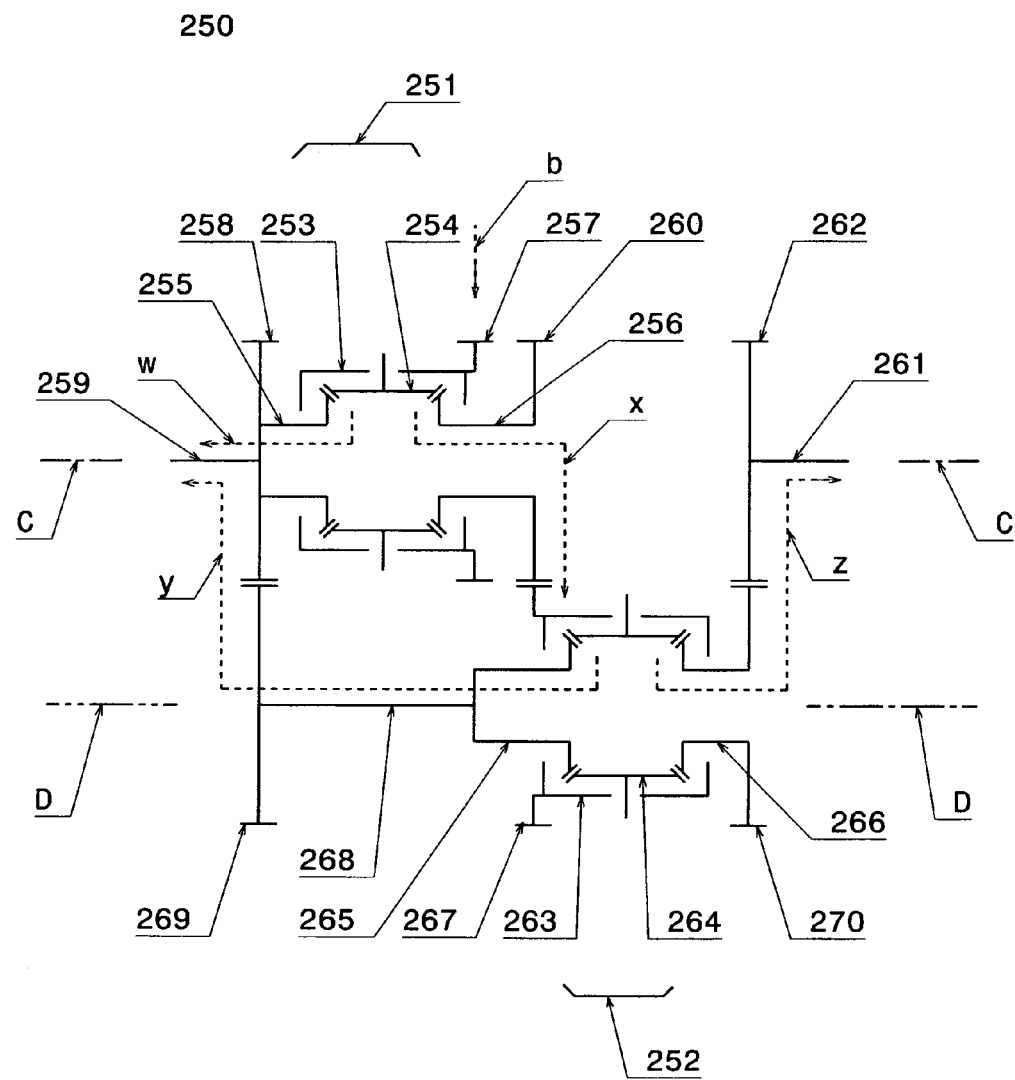
FIG. 12 is a schematic representation of the differential with torque distribution in a third embodiment.

Referring to FIG. 12, the differential with torque distribution in a third embodiment 250 comprises two differentials 251 and 252. The differential 251 comprises a housing 253, two side gears 255 and 256, a set of pinion gears 254. The side gear 255, 256, and the set of the pinion gears 254 are pivotally positioned in the housing 253. The set of pinion gears 254 mesh with the side gears 255 and 256. The differential 252 comprises a housing 263, two side gears 265 and 266, a set of pinion gears 264. The side gear 265, 266, and the set of pinion gears 264 are pivotally positioned in the housing 263. The set of pinion gears 264 mesh with the side gears 265 and 266. The differential 251 is pivotally positioned about an axis C. The differential 252 is pivotally positioned about an axis D. The axis C and D are parallel to each other. Shafts 259 and 261 are pivotally positioned about the axis C. A gear 257 is firmly connected to the housing 253. A gear 258 is connected to the side gear 255 and the shaft 259 such that the side gear 255, the shaft 259, and the gear 258 rotate together. A gear 262 is connected to the shaft 261 such that the shaft 261 and the gear 262 rotate together. A shaft 268 is pivotally positioned about the axis D. The shaft 268 is connected to the side gear 265 and a gear 269 such that the side gear 265, the shaft 268, and the gear 269 rotate together. Alternatively, the shaft 268 can be a part of the gear 269 structurally. A gear 267 is firmly connected to the housing 263. A gear 270 is connected to the side gear 266 such that the side gear 266 and the gear 270 rotate together. The gears 258, 260, and 262 can be made of the same size and number of teeth. The gears 267, 269, and 270 can be made of the same size and number of teeth. The gear 258 meshes with the gear 269. The gear 260 meshes with the gear 267. The gear 262 meshes with the gear 270.

The driving torque b is applied to the gear 257, and transferred to and equally shared by the side gears 255 and 256 through the housing 253 and the set of pinion gears 254. The torque w on the side gear 255 and the torque x on the side gear 256 are about 50% of the torque b each. The torque w is transferred onto the shaft 259. The torque x is transferred to and shared by the side gears 265 and 266 through the gears 260, 267, the housing 263, the set of pinion gears 264. The torque y on the side gear 265 and the torque z on the side gear 266 are about 50% of the torque x each. The torque y is transferred to the shaft 259 through the gears 269 and 258. The torque z is transferred to the shaft 261 through the gears 270 and 262. Thus the torque on the shaft 259 is the addition of the torque w and y, and is about 75% of the torque b. The torque on the shaft 261 is about 25% of the torque b.

Figure 13:
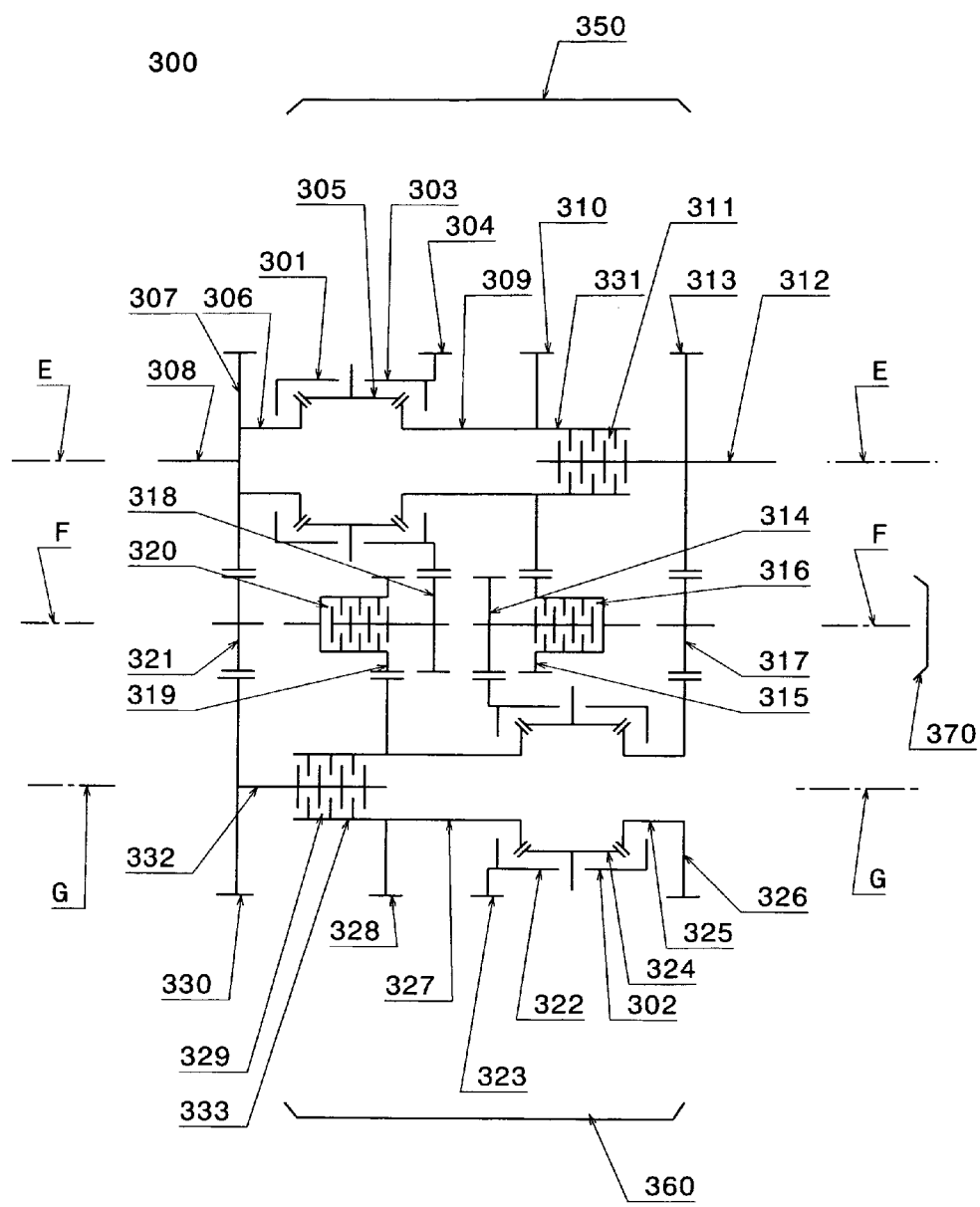
FIG. 13 is a schematic representation of the differential with torque distribution in a fourth embodiment.

FIG. 13 shows the differential with torque distribution in a fourth embodiment 300. It comprises two differentials 301 and 302 parallel to each other with an offset between the differential 301's rotating axis and the differential 302's rotating axis. The differential with the torque distribution 300 is configured in two differential units 350 and 360, a transfer unit 370. The differential unit 350 comprises the differential 301, two output shafts 308 and 312, 4 gears 304, 307, 310, 313, and a clutch 311. The differential 301 comprises a housing 303, a set of pinion gears 305, two side gears 306 and 309. It is pivotally positioned abound an axis E. The set of pinion gears 305, the side gears 306, 309 are pivotally positioned in the housing 303. The set of pinion gears 305 mesh with the side gears 306 and 309. The gear 304 is firmly connected to the housing 303. The gear 307 is firmly connected to the side gear 306. The output shaft 308 is pivotally positioned about the axis D and firmly connected to the gear 307. The gear 310 is firmly connected to the side gear 309. The output shaft 312 is pivotally positioned about the axis E. The gear 313 is firmly connected to the output shaft 312. The clutch 311 is housed in an extension 331 of the side gear 309, and connects the side gear 309 to the output shaft 312 when it is activated.

The differential unit 360 comprises a differential 302, a shaft 332, 4 gears 323, 326, 328, 330, and a clutch 329. The differential 302 comprises a housing 322, a set of pinion gears 324, two side gears 325 and 327. It is pivotally positioned abound an axis G. The set of pinion gears 324, the side gears 325, 327 are pivotally positioned in the housing 322. The set of pinion gears 324 mesh with the side gears 325 and 327. The axis G is parallel to the axis E. The gear 323 is firmly connected to the housing 322. The gear 326 is firmly connected to the side gear 325. The gear 328 is firmly connected to the side gear 327. The shaft 332 is pivotally positioned about the axis G. The gear 330 is firmly connected to the shaft 332. The clutch 329 is housed in the extension 333 of the side gear 327, and connects the side gear 327 and the shaft 331 when it is activated.

The transfer unit 370 comprises six gears 314, 315, 317, 318, 319, 321, two clutches 316 and 320. The gears 314, 315, 317, 318, 319, 321 are pivotally positioned about an axis F. The axis F is parallel to the axis E. The clutch 316 is housed in the gear 315, and connects the gears 314 and 315 when it is activated. The clutch 320 is housed in the gear 319, and connects the gears 318 and 319 when it is activated. The gear 317 meshes with the gears 313 and 326. The gear 315 meshes with the gear 310. The gear 314 meshes with the gear 323. The gear 318 meshes with the gear 304. The gear 319 meshes with the gear 328. The gear 321 meshes with the gears 307 and 330. The gears 304, 307, 310, 313, 323, 326, 328, and 330 can be made with the same size and number of teeth. The gears 314, 315, 317, 318, 319, and 321 can be made with same size and number of teeth.

Figure 14:
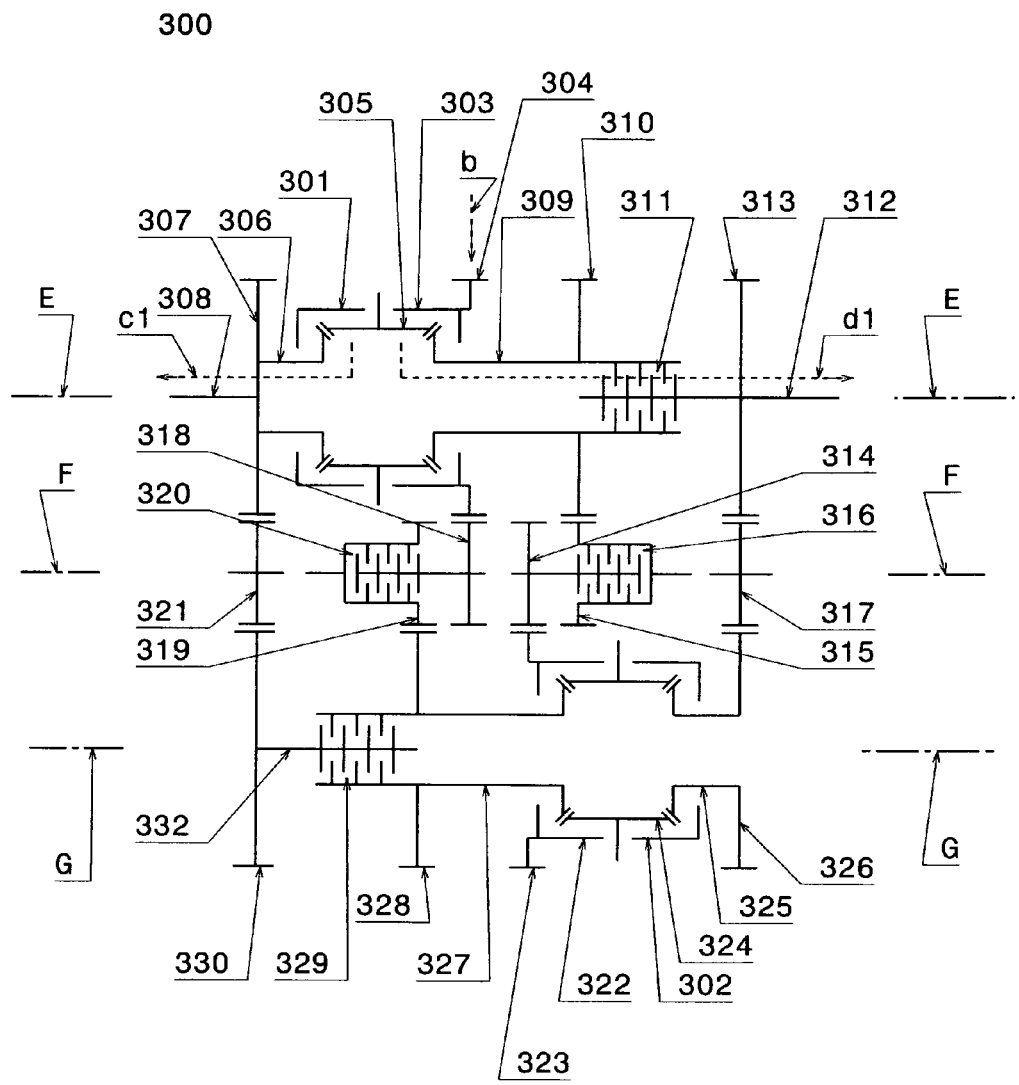
FIG. 14 is a schematic representation of mode 1 of the differential with torque distribution in the fourth embodiment.

Referring to FIG. 14, the clutch 311 is activated and connects the side gear 309 to the output shaft 312. Other clutches are deactivated. The driving torque b is applied to the gear 304 and is transferred to and equally shared by the side gears 306 and 309 through the housing 303, the pinion gears 305. The torque c1 on the side gear 306 is transferred onto the shaft 308, the torque d1 on the side gear 309 is transferred onto the shaft 312 through the clutch 311. The torque c1 on the output shaft 308 and the torque d1 on the output shaft 312 are each about 50% of the torque b. The shaft 308 and 312 can rotate at the same or different speed, which is independent of the torque c1, d1. This is mode 1.

Figure 15:
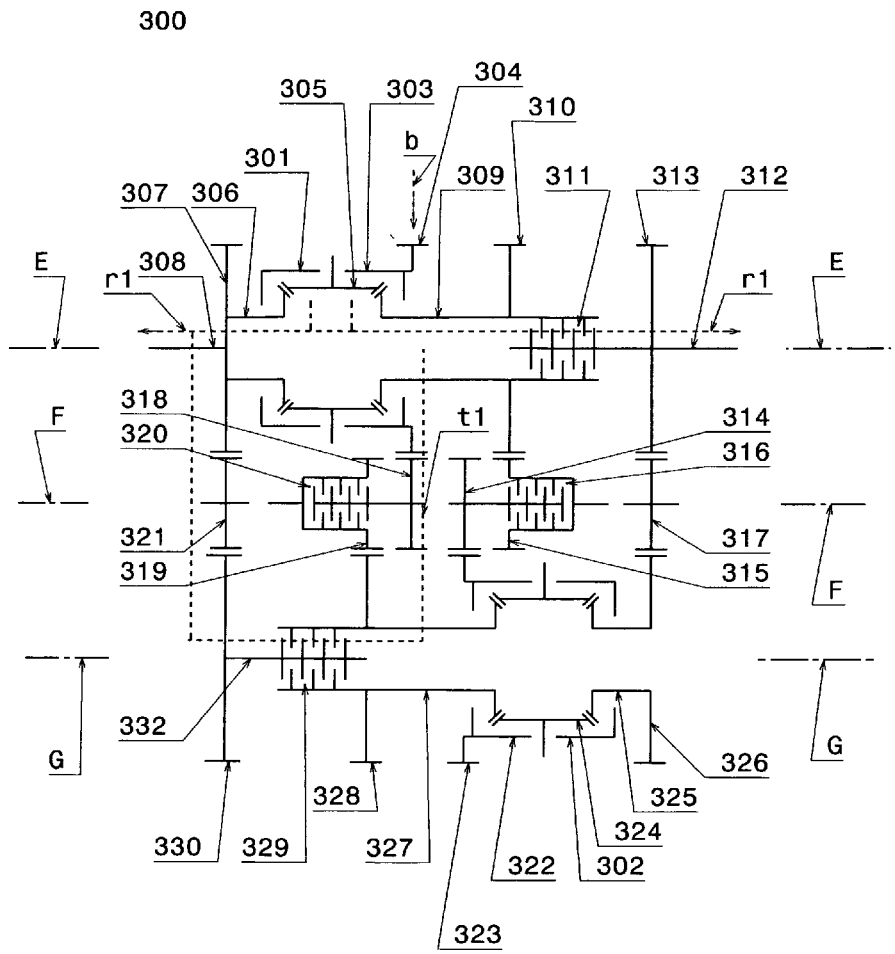
FIG. 15 is a schematic representation of mode 2 of the differential with torque distribution in the fourth embodiment.

Referring to FIG. 15, the clutch 311, 320, 329 are activated, the side gear 309 is connected to the shaft 312, the gear 318 is connected to the gear 319, the gear 328 is connected to the gear 330. Thus the side gears 306, 309, and the housing 305 are tide together. The driving torque is evenly transferred to the shaft 308 and 312. The shaft 308 and 312 rotate at the same speed. This is mode 2.

Figure 16:
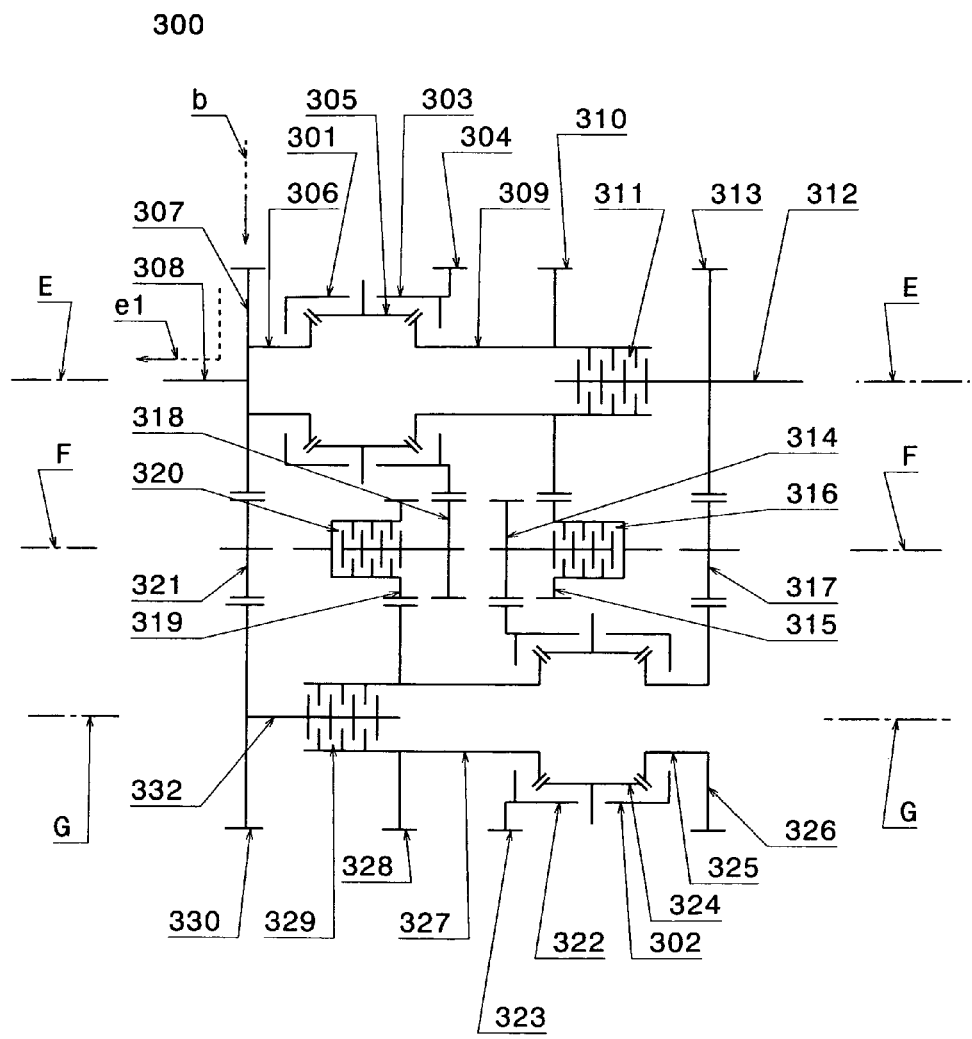
FIG. 16 is a schematic representation of mode 3 of the differential with torque distribution in the fourth embodiment.

Referring to FIG. 16, all clutches are deactivated. The driving torque b is applied to the gear 307 and is transferred about 100% to the output shaft 308. The shaft 312 rotates freely. This is mode 3.

Figure 17:
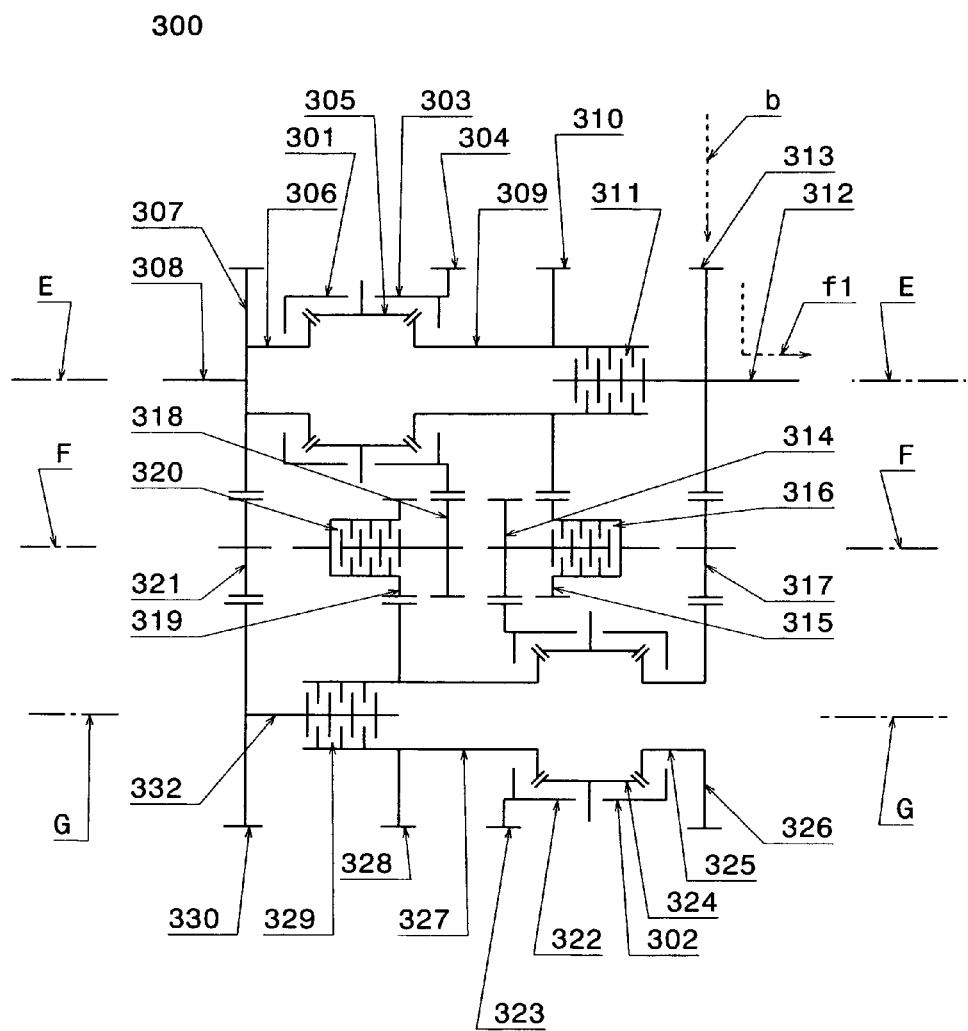
FIG. 17 is a schematic representation of mode 4 of the differential with torque distribution in the fourth embodiment.

Referring to FIG. 17, all clutches are deactivated. The driving torque b is applied to the gear 313 and is transferred about 100% to the output shaft 312. The shaft 308 rotates freely. This is mode 4

Figure 18:
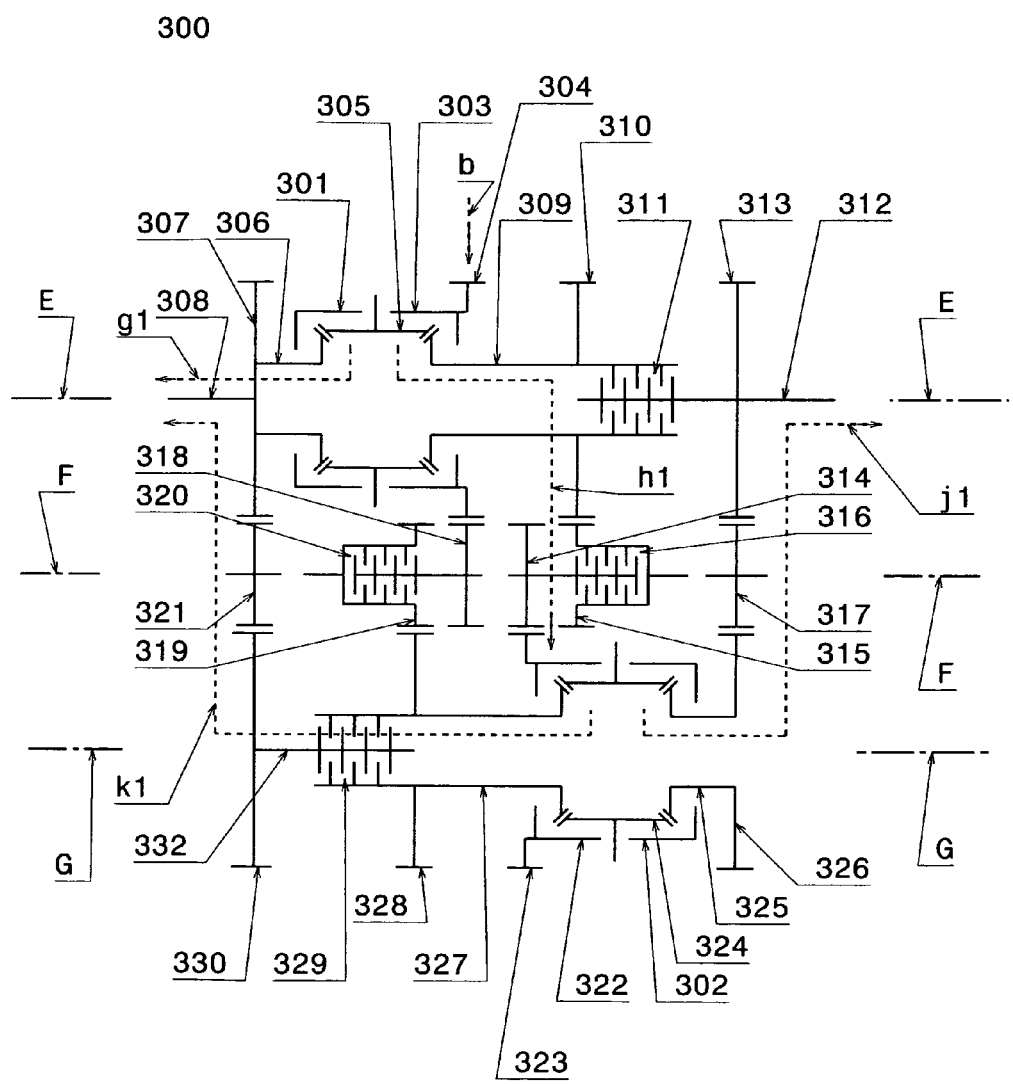
FIG. 18 is a schematic representation of mode 5 of the differential with torque distribution in the fourth embodiment.

Referring to FIG. 18, the clutches 316 and 329 are activated, 311 and 320 are deactivated. The driving torque b is applied to the gear 304 and is transferred to and equally shared by the side gear 306 and 309 through the housing 303, the set of pinion gears 305. The torque g1 on the side gear 306, the torque h1 on the side gear 309 are about 50% of the driving torque b each. The torque g1 on the side gear 306 is transferred to the output shaft 308. The torque k1 on the side gear 309 is transferred to and equally shared by the side gears 325 and 327 through the gears 310, 315, the clutch 316, the gears 314 and 323, the housing 322, the set of pinion gears 324. The torque j1 on the side gear 325, the torque k1 on the side gear 327 are about 50% of the torque h1 each. The torque j1 on the side gear 325 is transferred to the output shaft 312 through the gears 326, 317, and 313, and is about .25% of the driving torque b. The torque k1 on the side gear 327 is transferred to the output shaft 308 through the clutch 329, the gears 330, 321, and 307, and is about 25% of the driving torque b. Thus the torque on the output shaft 308 is the addition of the torque g1 and the torque k1, and is about 75% of the driving torque b. The torque on the output shaft 312 is about 25% of the driving torque b. The shaft 308 and 312 can rotate at the same or different speed, which is independent of the torque g1, j1, k1. This is mode 5.

Figure 19:
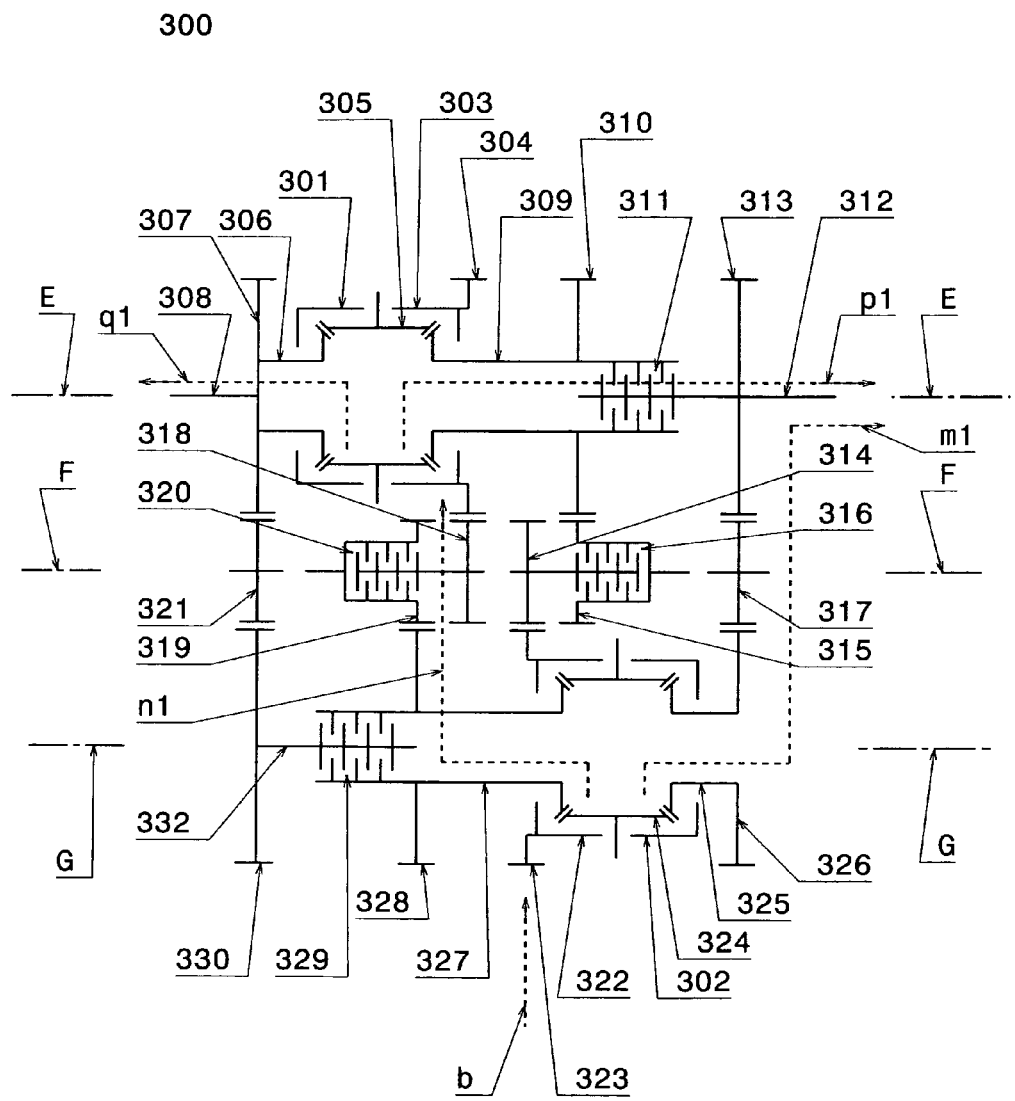
FIG. 19 is a schematic representation of mode 6 of the differential with torque distribution in the fourth embodiment.

Referring to FIG. 19, the clutches 311 and 320 are activated, 316 and 329 are deactivated. The driving torque b is applied to the gear 323 and is transferred to and equally shared by the side gear 325 and 327 through the housing 322, the set of pinion gears 324. The torque m1 on the side gear 325, the torque n1 on the side gear 327 are about 50% of the driving torque b each. The torque m1 on the side gear 325 is transferred to the output shaft 312 through the gears 325, 317, and 313. The torque n1 on the side gear 327 is transferred to and equally shared by the side gears 306 and 309 through the gears 328, 319, the clutch 320, the gears 318 and 304, the housing 303, the set of pinion gears 305. The torque q1 on the side gear 306, the torque p1 on the side gear 309 are about 50% of the torque n1 each. The torque q1 on the side gear 306 is transferred to the output shaft 308 and is about .25% of the driving torque b. The torque p1 on the side gear 309 is transferred to the output shaft 312 through the clutch 311 and is about 25% of the driving torque b. Thus the torque on the output shaft 312 is the addition of the torque m1 and p1, and is about 75% of the driving torque b. The torque on the output shaft 308 is about 25% of the driving torque b. The shaft 308 and 312 can rotate at the same or different speed, which is independent of the torque p1, q1, m1. This is mode 6.

As in the second embodiment, the change of the torque on the shafts 308 and 312 is independent of the speed or speed change of the shafts 308 and 312 during mode switching in the fourth embodiment 300 of the differential with torque distribution. The fourth embodiment 300 uses clutches for redistributing torque flow between the two differentials 301 and 302, instead of moving components as the design 200. Thus it can have the smoothness and quick response, which clutch typically provides, during its torque redistribution, e.g. mode switching among the modes 1, 2, 3, 4, 5, and 6.

Figure 20:
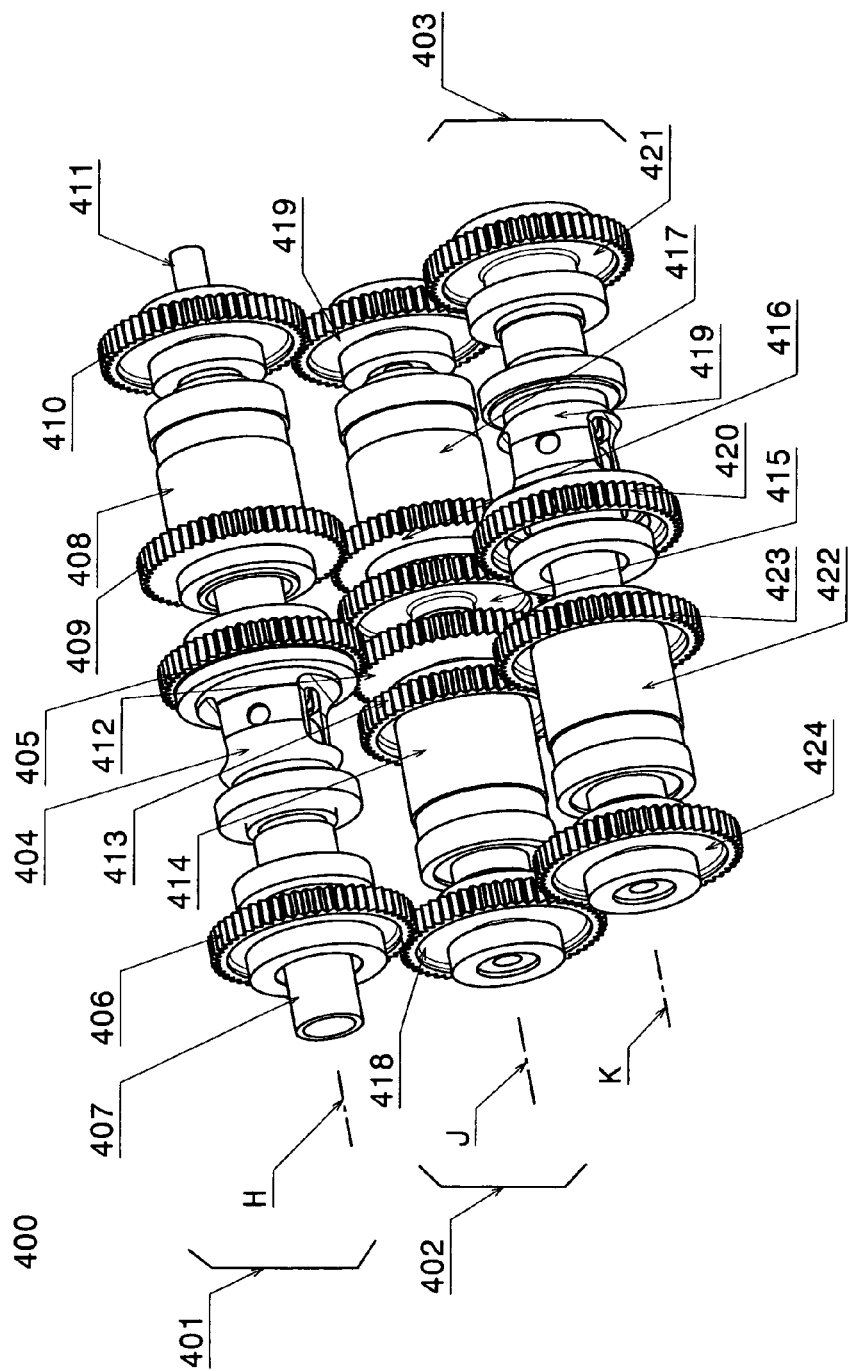
FIG. 20 is an view of a design of the fourth embodiment of the differential with torque distribution.

Referring to FIG. 20, a design 400 of the fourth embodiment 300 of the differential with torque distribution comprises a differential unit 401, a transfer unit 402, and a differential unit 403. The differential unit 401 comprises a differential 404, a clutch 408. The differential unit 401 is pivotally positioned about an axis H. The transfer unit comprises two clutches 414, 417. The transfer unit 402 is positioned about an axis J. The differential unit 403 comprises a differential 419, a clutch 422. The differential unit 403 is positioned about an axis K. The axis H, J, and K are parallel to one another. The differential unit 401 resembles the differential unit 350. The transfer unit 402 resembles the transfer unit 370. The differential unit 403 resembles the differential unit 360. The design 400 has 6 modes of operation as outlined in the fourth embodiment 300.

What is claimed is:

1. A differential apparatus with torque distribution comprising:
   (a) a first differential member comprising a first housing member, a first side gear member pivotally positioned in said first housing member, a second side gear member pivotally positioned in said first housing member, a first set of pinion gear members pivotally positioned in said first housing member, said first set of pinion members meshes with said first side gear member and said second side gear member;
   (b) a axis about which said first housing, said first side gear member, and said second side gear member rotate;
   (c) a second differential member comprising a second housing member, a third side gear member pivotally positioned in said second housing member, a fourth side gear member pivotally positioned in said second housing member, a second set of pinion gear members pivotally positioned in said second housing member, said second set of pinion gear members meshes with said third side gear member and said fourth side gear member;
   (d) said second housing, said third side gear member, and said fourth side gear member rotate about said axis;
   (e) a first shaft member pivotally positioned along said axis;
   (f) a second shaft member pivotally positioned along said axis;
   (g) a third shaft member pivotally positioned along said axis;
   (h) a first coupling member which connects said first side gear member to said first shaft member upon said first coupling member's engagement;
   (i) a second coupling member which connects said second side gear member to said second shaft member upon said second coupling member's engagement;
   (j) a third coupling member which connects said third side gear member to said second shaft member upon said third coupling member's engagement;
   (k) a fourth coupling member which connects said fourth side gear member to said third shaft member upon said fourth coupling member's engagement;
   (l) a fifth coupling member which connects said second shaft member to said first shaft member upon said fifth coupling member's engagement;
   (m) a sixth coupling member which connects said second shaft member to said third shaft member upon said sixth coupling member's engagement;
   (n) a seventh coupling member which connects said second side gear member to said second housing member in a first configuration of said fourth coupling member upon said fourth coupling member's engagement, and connects said third side gear member to said first housing member in a second configuration of said fourth coupling member upon said fourth coupling member's engagement;
   (o) a first mode wherein said first, said second, said sixth coupling member engage;
   (p) a second mode wherein said first, second, said fifth, said sixth coupling member engage;
   (q) a third mode wherein said first coupling member engages;
   (r) a fourth mode wherein said fourth coupling member engages;
   (s) a fifth mode wherein said first, said third, said fourth, said fifth coupling member engage, said seventh coupling member engages in said first configuration of said seventh coupling member;
   (t) a sixth mode wherein said first, said second, said fourth, said sixth coupling member engage, said seventh coupling member engages in said second configuration of said seventh coupling member.

2. The said differential apparatus with torque distribution set forth in claim 1 wherein said differential apparatus with torque distribution is in said first mode, a torque is applied to said first housing member, a first portion of said torque is distributed to said first side gear member and transferred to said first shaft member, a second portion of said torque is distributed to said second side gear member and transferred to said second shaft member.

3. The said differential apparatus with torque distribution set forth in claim 1 wherein said differential apparatus with torque distribution is in said third mode, a torque is applied to said first side gear member and transferred to said first shaft member.

4. The said differential apparatus with torque distribution set forth in claim 2 wherein said differential apparatus with torque distribution is in said fourth mode, a torque is applied to said second housing member and transferred to said second shaft member.

5. The said differential apparatus with torque distribution set forth in claim 2 wherein said differential apparatus with torque distribution is in said fifth mode, a torque is applied to said first housing member, a first portion of said torque is distributed to said first side gear member, a second portion of said torque is distributed to said second side gear member and transferred to said second housing member, a first portion of said second portion of said torque is distributed to said third side gear member, a second portion of said second portion of said torque is distributed to said fourth said side gear member, said first portion of said torque is transferred to said first shaft, said first portion of said second portion of said torque is transferred to said first shaft, said second portion of said second portion of said torque is transferred to said second shaft.

6. The said differential apparatus with torque distribution set forth in claims 1 wherein said differential apparatus with torque distribution is in said sixth mode, a torque is applied to said second housing member, a first portion of said torque is distributed to said fourth side gear member, a second portion of said torque is distributed to said third side gear member and transferred to said first housing member, a first portion of said second portion of said torque is distributed to said second side gear member, a second portion of said second portion of said torque is distributed to said first said side gear member, said first portion of said torque is transferred to said second shaft, said first portion of said second portion of said torque is transferred to said second shaft, said second portion of said second portion of said torque is transferred to said first shaft.

7. The said differential apparatus with torque distribution as set forth in claim 1 wherein change of rotational speed of said first shaft member is independent of change of torque on said first shaft member when said differential apparatus with torque distribution is switched in mode among said first, third, fourth, fifth, and sixth modes; change of rotational speed of said second shaft member is independent of change of torque on said second shaft member when said differential apparatus with torque distribution is switched in mode among said first, third, fourth, fifth, and sixth modes.

* * * * *